July 16, 1929.  M. P. WHITNEY  1,721,241
ENGINE STARTER
Filed April 5, 1928  3 Sheets-Sheet 1

Inventor
Maurice P. Whitney

July 16, 1929.  M. P. WHITNEY  1,721,241
ENGINE STARTER
Filed April 5, 1928  3 Sheets-Sheet 2

Inventor
Maurice P. Whitney

July 16, 1929.                M. P. WHITNEY                1,721,241
                              ENGINE STARTER
                           Filed April 5, 1928        3 Sheets-Sheet 3
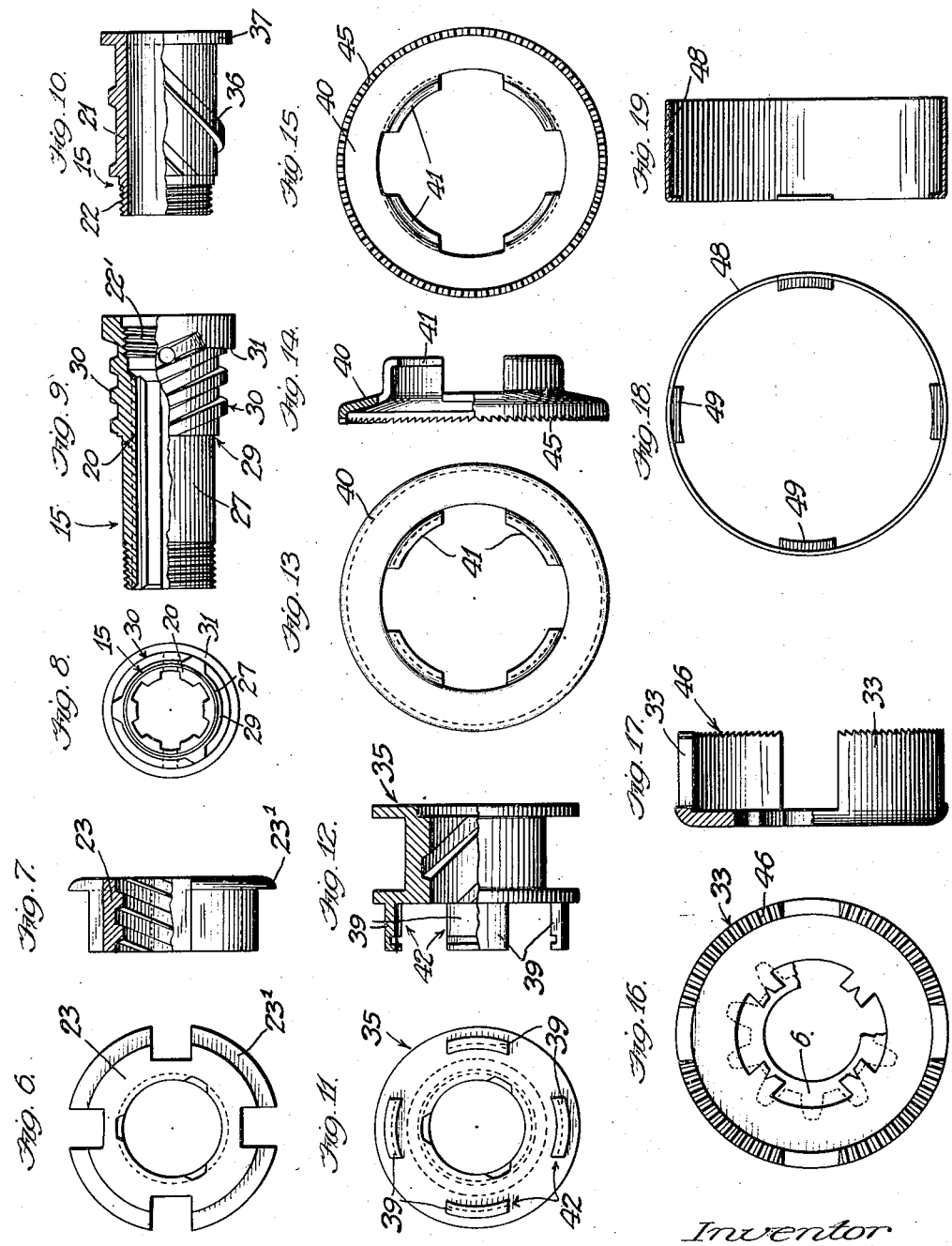
Witness
Martin H. Olsen
Inventor
Maurice P. Whitney
By Rector, Hibben, Davis & Macauley
Atty's Patented July 16, 1929.

1,721,241

UNITED STATES PATENT OFFICE.

MAURICE F. WHITNEY, OF ELMIRA, NEW YORK, ASSIGNOR TO ECLIPSE MACHINE COMPANY, OF ELMIRA, NEW YORK, A CORPORATION OF NEW YORK.

ENGINE STARTER.

Application filed April 5, 1926. Serial No. 267,537.

My invention relates to engine-starting apparatus for the starting of internal combustion engines, and more particularly, but not necessarily, automobile engines. The general object of my invention is to provide a simple, efficient and reliable starter of the manual shift type, in the operation of which the operator moves a driving member, such as a pinion, into position for engagement with a member of the engine to be started, such as its flywheel, and also activates a prime mover, such as an electric motor, provision being made for torque transference from the motor-driven power shaft to the driving member through an interposed friction clutch which is adapted and arranged for automatic control such that the clutch engages, for effective torque-transmission, while the motor drives the engine-member but disengages, to prevent such torque-transmission, when the engine picks up and runs under its own power. A further object is to provide effective means, in the operating connections by which the operator manually shifts the drive, for automatically insuring proper meshing of the drive-pinion with the gear of the engine flywheel should these gear-parts come into end-abutment when the drive is manually shifted. Among the more specific objects sought and attained by my invention are, novelly to provide advantageous construction and cooperation of parts throughout the drive structure, contributing to ease of manufacture, low cost, rugged durability and minimization of troubles in service, and other and further objects will become apparent from the following description, taken in conjunction with the accompanying drawings.

In the drawings, Fig. 1 is a longitudinal vertical section, with parts in elevation, of a drive embodying my invention, with associated parts fragmentarily shown;

Fig. 1ª is a small side elevation, with parts broken away, diagrammatically showing an installation on an automobile;

Figs. 6 and 7 are respectively an end view and a side elevation with parts broken away of a control nut;

Figs. 8 and 9 are respectively an end view and a side view with parts broken away of the front portion of the screw sleeve with which said control nut coacts;

Fig. 10 is a side elevation with parts broken away of the rear portion of said screw sleeve, detached;

Figs. 11 and 12 are an end elevation and a side view with parts broken away of a shifter collar that coacts with said rear portion of said screw sleeve;

Figs. 13, 14 and 15 are respectively a rear elevation, a side view with parts broken away and a front elevation of a pinion-mesh controller that rides on and with said shifter collar;

Figs. 16 and 17 are respectively a rear elevation of a pinion-carried clutch-shell (showing a fragment of the pinion) and a side elevation thereof with parts broken away; and Figs. 18 and 19 are respectively an end elevation and a vertical cross section of a detachable clutch-casing.

Figure 1:
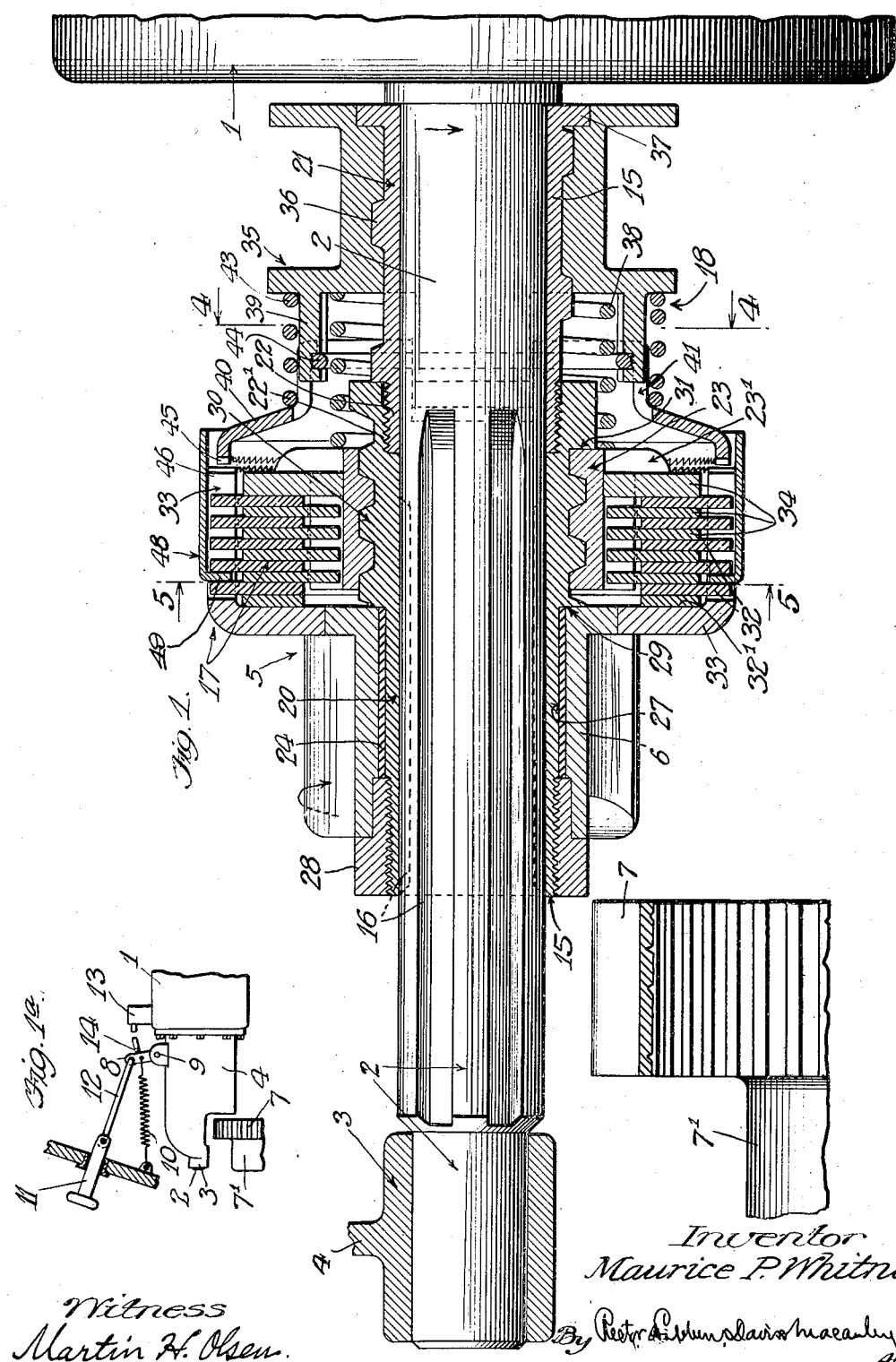
Figure 2:
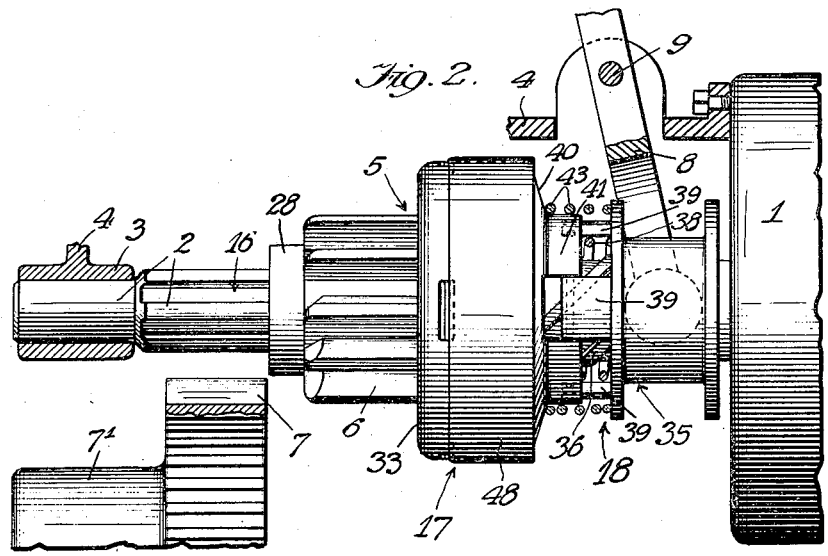
Fig. 2 is a side elevation, with casing parts broken away.
Figure 3:
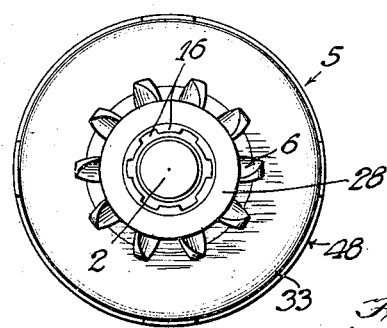
Fig. 3 is an end view of the drive, from the left end of Fig. 2, with the housing therefor removed.
Figure 4:
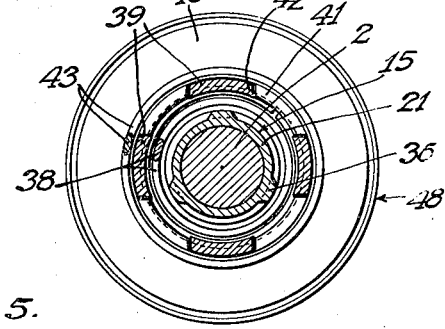
Fig. 4 is a cross section on line 4—4 of Fig. 1.
Figure 5:
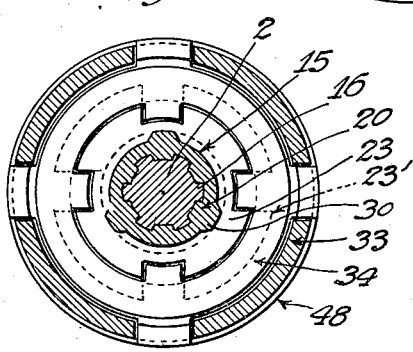
Fig. 5 is a cross section on line 5—5 of Fig. 1.

In the particular construction here shown, the prime mover 1 takes form as an electric motor, the shaft 2 whereof is forwardly extended to form a convenient direct-driving power-shaft, its outboard end finding support in a bearing 3 of a housing 4 which is secured to the frame of motor 1 as a fixed extension thereof. The drive as a whole, designated by numeral 5, is here shown as being longitudinally shiftable along the shaft 2 so that its driving-member 6, here taking form as a spur pinion with chamfered tooth-ends, may be engaged with or disengaged from a suitable peripheral gear 7 of a suitable member of the engine to be started, such as the flywheel 7' thereof, fragmentarily shown. Suitable provisions by which the operator may shift the drive "manually"—that is to say, by his own power and at will—are shown as comprising a shifter-lever 8, pivoted as at 9 in an opening of the housing to coact at one end with the shifter collar to be described and at its other end to be acted upon by the retracting spring 10 and by the plunger pedal 11, linked as at 12 to the shifter lever. Depression of plunger 11 may serve to start the motor 1 when the drive has been substantially fully advanced to engine-engaging position, and to this end the motor-controlling push-switch 13 may be actuated by the adjustable striker 14 shown in Fig. 1ª.

The drive-structure 5 comprises, in a unitary, shiftable assembly, an association of parts as follows: a sleeve-structure 15 that is movable along but rotatable with its power shaft, as by provision of the spline connection 16 between these parts; the pinion 6, which is axially shiftable with but rotatable relative to such sleeve; a friction-clutch 17, which is interposed as a torque transmitter between the sleeve and the pinion in such arrangement as to be automatically engaged when motor drives the engine and released when the engine operates under its own power; and a shifter-equipment 18. Such shifter-equipment normally serves merely to advance and retract the pinion 6 into and out of engagement with engine-gear 7 accordantly with the depression or retraction of the plunger-pedal 11 but it is so constructed and combined as to serve, on occasion, as a mesh-finder, to insure meshing of the pinion and gear by rotating the pinion with respect to the sleeve-structure 15 when the manual advancement of the drive as a whole chances to bring the teeth of pinion 6 and gear 7 into end-to-end abutment.

In the particular construction shown sleeve 15 is mechanically divided into a front portion 20 and a rear portion 21, these being separately made for manufacturing convenience and screwed together as at 22, 22' to unite them for all practical purposes. The rear portion coacts with the shifter collar for purposes presently to be described, and the front portion coacts with the control-nut 23 that automatically governs the operation of clutch 17, and through it transmits torque to pinion 6.

Specifically, pinion 6, preferably bushed as at 24, has rotative bearing on the smooth portion 27 of sleeve-member 20 but is held against axial displacement thereon. Stop ring 28, screwed onto the front end of the sleeve, coacts with the front end of the pinion, and the shoulder 29 of a sleeve-enlargement positions the rear end of the pinion.

Back of this sleeve-enlargement the sleeve-section 20 has a "right-hand" screw thread 30, and on it is screwed the control-nut 23 for the friction clutch. The range of axial movement of this control-nut 23 may be slight— merely enough for forcefully engaging or effectively disengaging the friction-elements of the clutch 17. Shoulder 31 on sleeve-member 20 may limit the rearward screw-travel of such nut 23.

Friction clutch 17 comprises two series of alternate disks in appropriate arrangement, one series, 32, being connected to the pinion 6, the other series connected to the control-nut 23. Thus, disks 32 are keyed to a shell or cup 33 suitably affixed to pinion 6 to form a rearwardly-extending shell-portion thereof, while the alternate disks 34 are keyed to the control-nut 23, the rearmost plate thereof being pressed against by the flange 23' of said control nut. The forewardmost disk 32 acts against the end of shell 33 through a spacing washer 32'.

Whenever the gear 6 slips into mesh with gear 7 readily, in the course of manual advancement of the drive 5, the parts thus far described in detail will operate for the desired torque-transmission from motor-shaft through clutch and driving pinion to the flywheel gear to start the engine; but where the pinion 6 chances to strike end-to-end against teeth of the flywheel gear 7, rotary displacement of the pinion relative to the screw shaft is desirable in order to bring about registry between the gear-toothed parts. To insure this, provision is made as follows:

The shifter-collar 35, between the annular flanges of which the yoke of shifter-lever 8 engages, makes screw-engagement with left-handed threads 36 upon the rear portion 21 of the screw sleeve, this being a desirable construction for capacitating said shifter-collar to move axially with, or to move axially and rotatably with respect to, said screw sleeve. Also, the shifter collar 35 is adapted and arranged to make operative engagement with the pinion-carried shell 33 and to move the latter rotatively with respect to the screw sleeve 20 when said shifter collar is axially advanced and rotatively displaced along the screw threads 36 which relative movement of the shifter collar will be manually compelled in the event that the pinion 6 strikes endwise against engine-gear 7. Normally the shifter-collar 35 is held back against rear-end flange 37 of the screw sleeve by pressure of the coiled-spring 38, which is interposed between the front wall of the collar and the rear surface of control-nut 23. From the front of the collar a cylinder-wall 39 projects to support and guide the pinion-adjuster 40, which serves, on occasion, to rotarily adjust the pinion 6 by coacting with the rear portion of pinion-carried shell 33.

This adjuster 40 is preferably a two-diameter cup with its smaller diameter walls cut to form tongues 41 slidably engaging in longitudinal slots 42 in the shifter-portion 39. A coiled spring 43, preferably encircling these inter-engaged portions is arranged to normally hold the adjuster in forwardmost position with respect to the shifter 35 and a spring-ring 44 (see Fig. 1) engaging the complementally inturned flanges of the slidably engaged parts acts to normally prevent their longitudinal separation. The forward annular edge of the adjuster is serrated as at 45 or otherwise suitably shaped for positive clutch purposes and the rear edge 46 of the pinion-carried clutch shell 33 is complementally shaped. The adjuster 40 is normally spaced apart slightly from the clutch-shell 33, but only a slight advancement of the shifter-collar longitudinally along the screw sleeve is requisite to screw the adjuster 40 into positive-clutch engagement with said pinion-carried shell.

Preferably a thin metal casing 48 to cover the clutch-elements is keyed into the clutch-plate-receptive slots of the casing-member 33, with its in-turned flange-lugs 49 (Fig. 18) engaged between suitable ones of the clutch-plates 32; but this casing or cover member may be dispensed with if desired.

In operation, manual depression of plunger 11 (Fig. 1a) first shifts the drive-unit 5 to the left (Fig. 1) to position where starter-pinion 6 may practically-fully engage the engine gear 7, and then closes the motor-starting switch 13. If the chamfered teeth of pinion 6 have slid easily into mesh with those of the flywheel, no relative movement has taken place between the shifter collar 35 and the pinion. The provision made for rotary adjustment of the pinion to insure mesh is not called into play under such conditions. When the stated mesh of the gear parts has been brought about and the motor-starting switch is closed, rotation of motor-shaft 2, in the direction of the arrow, Fig. 1, is imparted to the screw sleeve 15 splined thereon and tends to rotate the screw-sleeve 15 within the control nut 23. Rotation of the nut 23 is resisted by reason of its clutch connection with the engine-engaged pinion and consequently the nut moves forwardly along the screw sleeve, thereby compressing or effectively engaging the friction-clutch elements so that the motor torque is transmitted through the friction clutch 17 to the pinion 6 to start the engine. As soon as the engine picks up and operates under its own power the pinion 6 is driven faster than the rotative speed of the screw sleeve 15 and so the clutch 17 is loosened or released, due to the control-nut 23 backing up somewhat along the screw-sleeve against the tension of spring 38, as it must under such conditions.

Should the teeth of pinion 6 abut against the ends of the teeth of engine gear 7 when the drive is sought to be manually shifted to engaging position, the pressure tending to advance shifter collar 35 causes it to progress longitudinally and rotatively with respect to the threaded rear portion 36 of the screw sleeve 17, with which portion said shifter collar coacts. The component of axial advancement of the collar quickly brings the toothed edge 45 of pinion adjuster 40 into positive-clutch engagement with the shell 33 of the clutch which, in turn, is fast on the pinion 6, and further longitudinal advancement of the shifter 35 merely telescopes it into the adjuster against the tension of spring 43. But after clutch edge 45 of the adjuster engages the pinion-carried shell 33, the rotary component of the movement of shifter 35 along the screw-threads 36 is imparted to said clutch-shell 33 and to the pinion 6, thereby turning the pinion with respect to the screw shaft 15 and acting to bring the pinion into registry with the flywheel gear 7 so that it may enter into mesh therewith. Expansion of spring 38, as this engagement takes place, tends to restore the parts of the drive and its shifter equipment to their normal relative positions.

It will be observed that all parts of the drive are of simple mechanical construction, each susceptible of factory production at low cost; that the mesh-insuring adjustment is very positively performed, and that this adjustment is performed through rugged parts extraneous to the friction-clutch 17 as such,— that is to say, without involving any operation of the clutch-elements as friction-clutch parts, although the clutch shell is conveniently used as a part of the positive clutch 46, 45.

Also it will be observed that the pinion 6 never moves longitudinally relative to the sleeve 15. Consequently when the parts act to insure meshing, and the pinion enters into mesh with the engine-gear 7, there is no impact of the sleeve or any associated part against the rear of the pinion or against a front stop-collar.

While I have herein described in detail a particular embodiment of my invention for purposes of full disclosure, it will be understood that many changes in construction and arrangement of parts, and adaptations to demands of particular installations, may be made without departure from the spirit of my invention within the scope of the appended claims.

I claim:

1. In an engine starter, a pinion, a rotatable, longitudinally shiftable shaft-member on which said pinion is mounted for no relative axial movement but for relative rotative adjustment, torque transmitting connections between said shaft-member and said pinion, manually-operable shifter-means for advancing said shaft-member and pinion, said pinion being adapted when advanced to engage a gear of an engine to be started, and means for rotatively adjusting said pinion relative to said shaft member when end-abutment of the pinion against the engine-gear interferes with advancement of the pinion by the shifter means.

2. In an engine starter, a pinion, a rotatable, longitudinally shiftable shaft-member on which said pinion is mounted for no relative axial movement but for relative rotative adjustment, torque transmitting connections between said shaft-member and said pinion, shifter-means for advancing said shaft-member and pinion, said pinion being adapted when advanced to engage a gear of an engine to be started, and means extraneous to said torque-transmitting connections for rotatively adjusting said pinion relative to said shaft member when end-abutment of the pinion against the engine-gear interferes with advancement of the pinion by the shifter means.

3. An engine starter including a rotatable drive shaft, a sleeve shiftable longitudinally with respect to and rotatable by said shaft, a driving pinion shiftable with said sleeve and adapted when advanced to engage a gear of an engine to be started, torque transmitting connections between said sleeve and driving pinion, shifter means for advancing said sleeve and pinion, and means extraneous to said torque transmitting connections for rotatively adjusting said pinion when end-abutment of the pinion against the engine gear interferes with advancement of the pinion by the shifter means.

4. An engine starter including a rotatable drive shaft, a sleeve shiftable longitudinally with respect to and rotatable by said shaft, a driving pinion shiftable with said sleeve and adapted when advanced to engage a gear of an engine to be started, a friction clutch in operative association with said sleeve and pinion, shifter means for advancing said sleeve and pinion and mesh insuring means actuated by said shifter means and extraneous to said friction clutch for rotatably adjusting said pinion when end-abutment of said pinion against said engine gear interferes with its advancement by said shifter means.

5. An engine starter including a rotatable shaft, a sleeve shiftable longitudinally with respect to and rotatable by said shaft, a driving pinion shiftable with said sleeve and rotatable on it, said pinion having a shell extension, torque transmitting connections between said sleeve and said pinion, shifter means for advancing said sleeve and pinion and shifter-actuated means operatively associated with said pinion-shell for rotatively adjusting said pinion when end-abutment of its teeth with the engine gear interferes with its longitudinal advancement by said shifter.

6. An engine starter including a rotatable shaft, a sleeve shiftable longitudinally with respect to and rotatable by said shaft, a driving pinion shiftable with said sleeve and rotatable on it, said pinion having a shell extension, a torque transmitting friction clutch operatively connecting said sleeve and pinion-shell and housed within said shell, shifter means for advancing said sleeve and pinion and shifter-actuated means operatively associated with said pinion-shell for rotatively adjusting said pinion when end-abutment of its teeth with the engine gear interferes with its longitudinal advancement by said shifter.

7. An engine starter drive comprising a longitudinally shiftable, rotatable screw member, a pinion mounted thereon for rotation with respect thereto and for advancement therewith to engage a gear of an engine to be started, automatic clutch means controlled by threads of said screw member for operatively connecting said pinion to rotate with said screw member, and shifter means for advancing said screw member having provision for operative connection with said pinion to rotate it and having connection with threads of said screw member for controlling the pinion-engaging and rotating operations of said shifter means.

8. An engine starter drive comprising a longitudinal shiftable, rotatable screw member having two oppositely threaded portions, a pinion rotatively loose on said screw member and longitudinally shiftable therewith and adapted when advanced to engage a gear of an engine to be started, a control nut on one threaded portion of said screw member, a friction clutch for operatively connecting said screw member and pinion and controlled by said control nut, shifter means engaging the outer threaded portion of said screw member and movable with and with respect to the same and means operatively associated with said shifter means for effecting operative connection with and rotatively adjusting said pinion when said shifter moves relatively to said screw member.

9. An engine starter drive comprising a longitudinally shiftable, rotatable screw member having two threaded portions, a pinion rotatably mounted on said screw member and longitudinally shiftable therewith and arranged when advanced to engage a gear of an engine to be started, friction-clutch means automatically controlled by one threaded portion of said screw member for operatively connecting said screw member to said pinion for torque transmission, and shift means for said screw member operatively associated with the other threaded portion of said screw member for thread-directed movement relatively thereto, said shifter means having provision to engage said pinion and rotatively adjust it in the movement of said shifter relatively to said screw member.

10. An engine starter drive comprising a longitudinally-shiftable, rotatable screw member having two oppositely threaded portions, a pinion rotatable on and longitudinally shiftable with said screw member and adapted when advanced to engage a gear of an engine to be started, a control member engaging one threaded portion of said screw member, a friction clutch between said pinion and screw member automatically controlled by said control member, a shifter member engaging the other threaded portion of said screw member, a spring interposed between said control member and said shifter member tending to move them normally to opposite ends of their movement relative to the screw member, and means operatively associated with said shifter member and said pinion for engaging them for rotation together during displacement of said shifter member from its normal position on the threaded portion of said screw member.

11. An engine starter drive comprising a longitudinally shiftable, rotatable screw member, a pinion mounted for rotation with respect thereto and for advancement therewith to engage a gear of an engine to be started, said pinion having a rearwardly extending shell portion, torque transmitting friction-clutch means within said shell portion and operatively connecting said screw member and pinion, a shifter member operatively associated with said screw member normally to move with the latter but movable longitudinally and rotatively with respect thereto, and positive clutch means interposed between said shifter member and said extension shell of the pinion for operatively connecting them when said shifter so moves relatively to said screw member.

12. An engine starter drive comprising a longitudinally shiftable, rotatable screw member, a pinion mounted for rotation with respect thereto and for advancement therewith to engage a gear of an engine to be started, said pinion having a rearwardly extending shell portion, torque transmitting friction-clutch means within said shell portion and operatively connecting said screw member and pinion, a shifter member operatively associated with said screw member normally to move with the latter but movable longitudinally and rotatively with respect thereto, and positive clutch means interposed between said shifter member and said extension shell of the pinion for operatively connecting them when said shifter so moves relatively to said screw member, said clutch means including a part rotatable with and yieldable longitudinally with respect to said shifter member.

13. An engine starter drive including a rotatable shaft, a screw-sleeve splined thereto for longitudinal movement thereon, a pinion rotatable on and longitudinally fixed to said screw shaft, a screw-controlled automatic friction clutch for operatively engaging said screw shaft and pinion, and shifter means movable with and with respect to said screw shaft and having provision for positive clutch engagement with said pinion, extraneously to said friction clutch, when said shifter member is longitudinally and rotatively moved with respect to said screw sleeve.

14. An engine starter drive comprising a longitudinally shiftable, rotatable screw member, a pinion rotatable thereon and axially movable therewith, having a rearwardly extending shell, automatically controlled friction-clutch means arranged within said shell for operatively connecting said screw member and pinion, a shifter member yieldingly positioned on said screw member in rear of said clutch and movable in a spiral path about and along said screw member, and positive clutch means between said shifter member and said shell of said pinion comprising two portions arranged to yield longitudinally and to rotate together.

MAURICE P. WHITNEY.